Jan. 15, 1952  S. S. ROBERTS  2,582,720
BROILER
Filed Sept. 14, 1946  2 SHEETS—SHEET 1
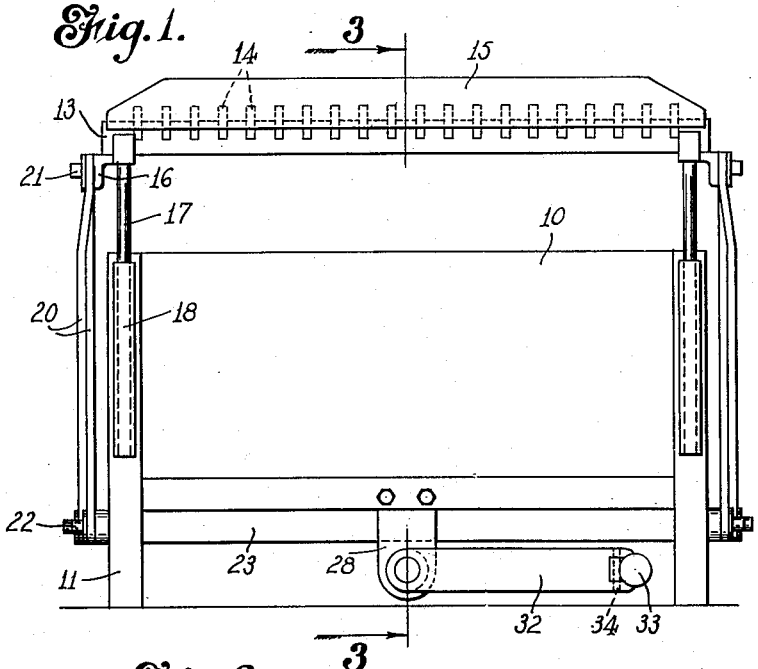
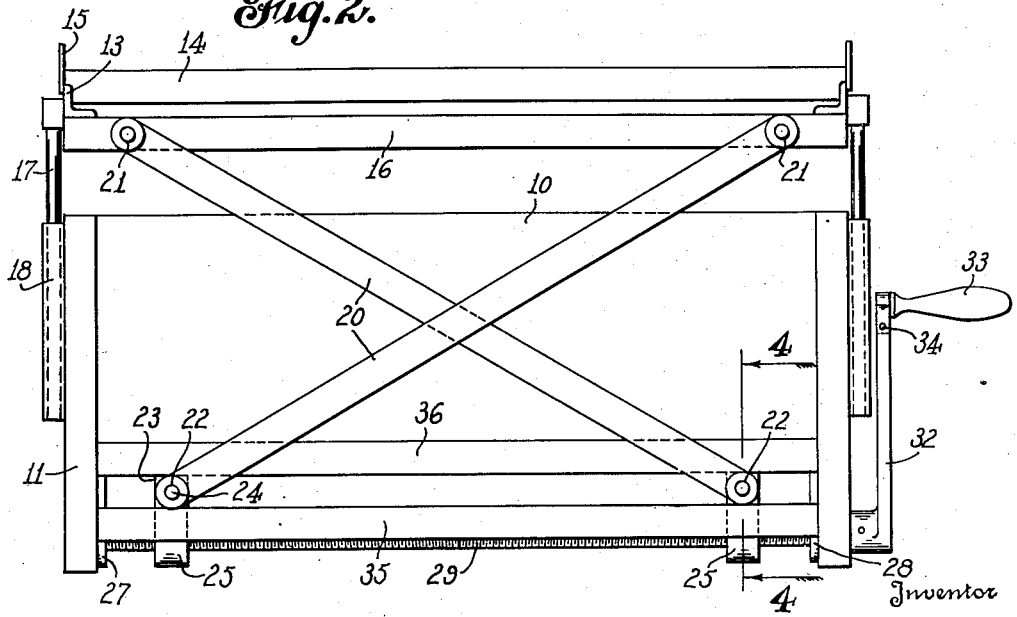

Jan. 15, 1952  S. S. ROBERTS  2,582,720
BROILER

Filed Sept. 14, 1946  2 SHEETS—SHEET 2

Inventor
Samuel S. Roberts
By
Rockwell, Southlow
Attorneys

Patented Jan. 15, 1952

2,582,720

UNITED STATES PATENT OFFICE 2,582,720

BROILER

Samuel S. Roberts, New Haven, Conn.

Application September 14, 1946, Serial No. 697,085

3 Claims. (Cl. 126—25)

This invention relates to broilers, and more particularly to that type of broiler provided with a firebox for the fuel and a grill disposed above the fuel upon which the material to be broiled is to be placed. It particularly relates to a device of this kind wherein the grill may be adjusted vertically relatively to the firebox, so that the distance of the grill from the fuel may be regulated as desired.

It is desirable in a device of this kind that the operating mechanism for the raising and lowering of the grill be disposed below, or at one side of the firebox so far as possible, so that it will not be subjected to the heat of the fuel. Also, it is desirable that the grill or grid be so arranged that it may be raised and lowered with ease and convenience and without tipping, so that the movement of all parts of the grill will take place evenly, which is particularly important when the grill is supported and raised by mechanism arranged entirely below it.

One object of the invention is to provide a broiler of the character described which shall be of relatively simple and inexpensive construction, and which may be provided with a vertically adjustable grill adapted to be raised and lowered with respect to the firebox, and which grill is properly guided in its movement.

A still further object of the invention is to provide a broiler of the character described which may be of compact form and wherein the grill is mounted upon guide rods slidably carried by guides supported by the firebox, and which will be provided with raising and lowering mechanism of improved form.

A still further object of the invention is to provide a broiler of the character described with means for raising and lowering the grill, so constructed that the grill will automatically remain in any position to which it is raised, that is to say, the weight of the grill cannot operate the raising and lowering means in a reverse direction, so that no special means will be required to secure the grill in any position to which it is adjusted.

To these and other ends the invention consists in the novel features and combinations of parts to be hereinafter described and claimed.

In the accompanying drawings:

Fig. 1 is a front elevational view of a broiler embodying my invention;

Fig. 2 is a side elevational view thereof;

Figure 3:
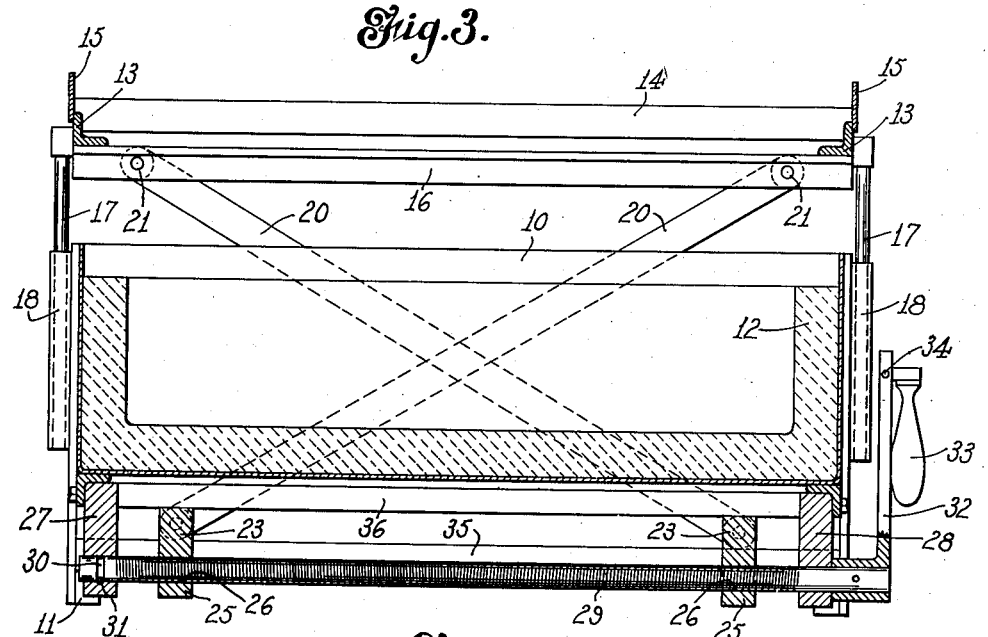
Fig. 3 is a sectional view on line 3—3 of Fig. 1.

In general, the broiler shown herein is similar to that shown in my prior Patent No. 2,386,815, and comprises a firebox 10 substantially rectangular in shape, which box may rest upon feet or standards 11 at each corner. As shown, the device may be conveniently made of sheet metal, the standards 11 being of angle iron, and the box may be lined with suitable refractory material 12, as shown, within which the fuel, such as charcoal, for example, may be placed.

The grill or grid may be of any suitable form, but, as illustrated, comprises a substantially rectangular frame of angle iron, as shown at 13, and supported upon these angle irons are bars or rails 14 forming the grill. Guards 15 may be provided at the front and rear ends of the grill.

The angle members 13 are at the front and rear ends of the device, and secured adjacent the ends of these members and extending along the sides of the grill are bars or rails 16, one at each side of the device, which rails may also be of angle shape in cross section, if desired. Thus a rigid frame is provided for a grill, and at each corner of this frame is fixedly secured a guire rod 17, these guide rods being slidably disposed in sleeves 18, one of these sleeves being secured at each corner of the firebox or upon each of the supporting standards 11. Thus it will be seen that the rigid grill frame will be suitably guided in its raising and lowering movements, so that there will be no tendency for it to tip.

I have also provided a novel raising and lowering means for the grill which may be operated from the firebox and at a point relatively near the base of the machine, so that the operator will not be subject to the heat of the fuel.

Connected to each of the rails 16 are a pair of links 20, the links being pivoted at their upper ends to the rails, as shown at 21, and extending downwardly at an inclined direction so that these links cross each other, and, as will be observed particularly from Fig. 1, they lie without and at the sides of the firebox. Also, as shown more particularly in Fig. 1, there is a pair of these links provided at each side of the firebox.

The lower end of each of the links is pivoted at 22 to an end of a transverse bar 23, the bars being provided with a projecting pivot rod 24 for this purpose, and one of the bars being provided adjacent the front and another adjacent the rear of the firebox across which the bars extend transversely. At the central portion of each bar is a depending lug 25 provided with a threaded opening 26, so that, as will be hereinafter explained, this lug will serve as a nut.

Secured below the firebox are supporting blocks 27 and 28, as shown more especially in Fig. 3, these blocks rotatably carrying a threaded shaft 29, which shaft is threadingly received in the openings in the lugs 25. As shown in Fig. 3, this shaft may be provided with an annular groove or channel 30 within which is received a pin 31 driven into the block 27, so that, while the shaft 29 may be freely rotated within the blocks 27 and 28, it is fixed against longitudinal movement. It will be understood that the shaft 29 has left-hand threads upon one end and right-hand threads upon the other end, and that the lugs or nuts 25 are provided with threads cooperating with those upon the adjacent end of the shaft.

The shaft 29 projects at the front of the machine, and on its projecting end is fixedly secured the operating crank 32, this crank being provided with a handle 33 by which it may be rotated. As shown more especially in Figs. 2 and 3, the handle 33 is pivoted to the crank at 34, so that it may be moved from an operative position shown in Fig. 2 to an inoperative folded position shown in Fig. 3. In the latter position, it will lie compactly against the crank, so that it will not interfere with the user of the device which normally stands at the front side of the firebox, at which side the handle is also located.

Figure 4:
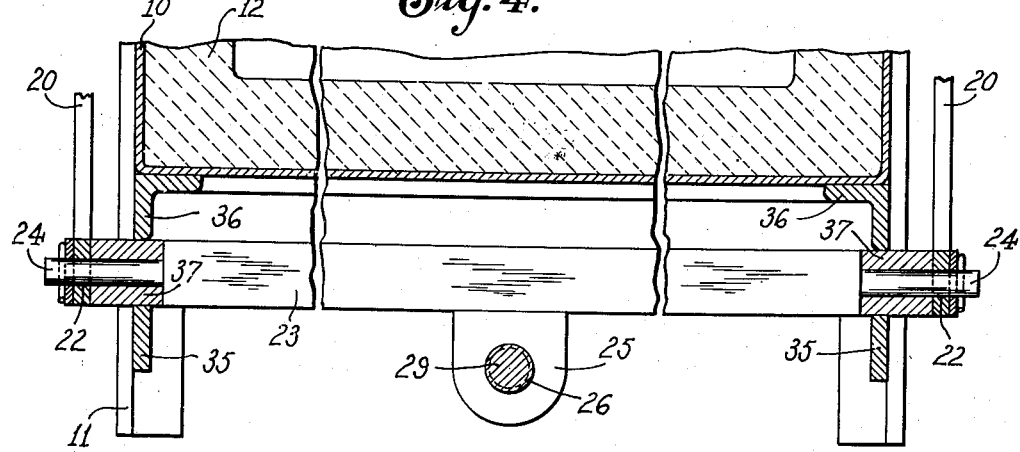
Fig. 4 is a partial sectional view on line 4—4 of Fig. 2.

The bars 23 are supported upon side rails 35 (Fig. 4), so that they may move forwardly and rearwardly between these rails and the angle irons 36 which support the firebox. Rollers 37 are rotatably mounted on the pivot rods 24 to lessen the friction attending this movement.

From the foregoing, it will be obvious that rotation of the crank 32 also serves to rotate the threaded shaft 29. This serves to move the lugs 25 and the bars 23 secured thereto longitudinally of the shaft, or to effect relative approaching and separating movements of these bars. As the bars are pivoted to the ends of the crossed links 20, the lower ends of these links will be caused to approach or separate from each other, thus causing a corresponding movement of the upper ends of the links and thus raising or lowering the grill.

It will be noted that as there are a pair of links 20 at each side of the box and that the upper end of the links are connected to the grill adjacent each of its four corners, the upward pressure upon the grill to raise it will be applied evenly at points adjacent the four corners which will effect an even and smooth movement of the grill, particularly when the latter is suitably guided at the corners by the guide rods 17.

It will also be appreciated that the weight of the grill will not effect a lowering movement thereof, in that the effect of this weight cannot move the nuts or lugs 25 along the threaded shaft 29 and that the grill can only be lowered by reverse rotation of the crank 32. Moreover, the arrangement for effecting the raising and lowering of the grill gives a considerably great leverage to the operator, so that these movements may be very easily effected and the crank 32 may be relatively short so that the handle 33 is positioned at a relatively low point with respect to the rest of the structure. Moreover, although the shaft 29 is operated from the front of the device where the user normally stands, nevertheless, by providing the crank 32 with a folding handle, the latter may be folded to a position where it will be out of the way and will not interfere with the activities of the user.

While I have shown and described a preferred embodiment of my invention, it will be understood that it is not to be limited to all of the details shown, but is capable of modification and variation within the spirit of the invention and within the scope of the claims.

What I claim is:

1. A broiler comprising a substantially rectangular firebox and a grill of substantially rectangular shape supported thereabove for raising and lowering movement, means for supporting and raising and lowering said grill comprising a pair of links pivoted to the grill at each side thereof at their upper ends, the links of each pair depending downwardly in diagonal fashion whereby they cross intermediate their ends, bars extending transversely to the firebox and projecting therefrom at their opposite ends, the lower ends of said links being pivoted to the projecting ends of the bars, rails secured below the firebox in spaced relation thereto upon which the ends of said bars are slidably supported, means for effecting relative approaching and separating movements of said bars, a guide rod secured to the grill at each corner thereof and depending downwardly therefrom, and a sleeve member secured at each corner of the firebox exteriorly thereof to receive one of said rods.

2. A broiler comprising a substantially rectangular firebox and a grill of substantially rectangular shape supported thereabove for raising and lowering movement, means for supporting and raising and lowering said grill comprising a pair of links pivoted to the grill at each side thereof at their upper ends, the links of each pair depending downwardly in diagonal fashion whereby they cross intermediate their ends, bars extending transversely to the firebox and projecting therefrom at their opposite ends, the lower ends of said links being pivoted to the projecting ends of the bars, rails secured below the firebox in spaced relation thereto upon which the ends of said bars are slidably supported, means for movements of said bars, said means comprising effecting relative approaching and separating movements of said bars, said means comprising a threaded shaft mounted below the firebox, members carried by said bars and threadedly engaged with the shaft, a guide rod secured to the grill at each corner thereof and depending downwardly therefrom, and a sleeve member secured at each corner of the firebox exteriorly thereof to receive one of said rods.

3. A broiler comprising a substantially rectangular firebox and a grill of substantially rectangular shape supported thereabove for raising and lowering movement, means for supporting and raising and lowering said grill comprising a pair of links pivoted to the grill at each side thereof at their upper ends, the links of each pair depending downwardly in diagonal fashion whereby they cross intermediate their ends, bars extending transversely to the firebox and projecting therefrom at their opposite ends, the lower ends of said links being pivoted to the projecting ends of the bars, rails secured below the firebox in spaced relation thereto upon which the ends of said bars are slidably supported, means for effecting relative approaching and separating movements of said bars, said means comprising a threaded shaft mounted below the firebox, members carried by said bars threadedly engaged with the shaft, a crank secured to the shaft at the front of the firebox, a guide rod secured to the grill at each corner thereof and depending downwardly therefrom, and a sleeve member secured at each corner of the firebox exteriorly thereof to receive one of said rods.

SAMUEL S. ROBERTS.

REFERENCES CITED

The following references are of record in the file of this patent:

UNITED STATES PATENTS

| Number | Name | Date |
|---|---|---|
| 1,352,352 | Caswell | Sept. 7, 1920 |
| 2,114,697 | Babin | Apr. 19, 1938 |
| 2,325,828 | Betts | Aug. 3, 1943 |
| 2,386,815 | Rubenstein | Oct. 16, 1945 |

FOREIGN PATENTS

| Number | Country | Date |
|---|---|---|
| 4,841 | Germany | Aug. 20, 1878 |
| 46,410 | Norway | Apr. 29, 1929 |
| 765,415 | France | Dec. 13, 1933 |
| 701,673 | Germany | Jan. 21, 1941 |